3,660,379
SYNTHETIC PENICILLINS
Shiro Morimoto, Kobe, Hiroaki Nomura, Osaka, Takeshi Fugono and Kihachiro Maeda, Hyogo, and Toshihiro Ishiguro, Osaka, Japan, assignors to Takeda Chemical Industries, Ltd., Osaka, Japan
No Drawing. Filed Sept. 29, 1969, Ser. No. 862,018
Claims priority, application Japan, Sept. 28, 1968, 43/70,572
Int. Cl. C07d 99/16
U.S. Cl. 260—239.1  25 Claims

ABSTRACT OF THE DISCLOSURE

Synthetic penicillins of the general formula

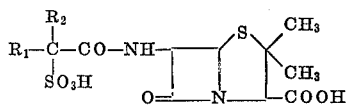

wherein $R_1$ and $R_2$ are hydrogen, alkyl, cycloalkyl, aralkyl or unsubstituted or substituted phenyl, pyridyl, naphthyl or thienyl or alternatively, $R_1$ and $R_2$ together form a polymethylene group, and pharmaceutical salts thereof, as well as a process for the preparation thereof. These compounds are useful as antibacterial agents, and especially against Gram-positive and Gram-negative bacteria.

The present invention relates to new synthetic compounds useful as antibacterial agents, nutritional supplements in animal feeds, and therapeutic agents in poultry and animals. In the treatment especially of infectious dis eases caused by Gram-positive and Gram-negative bacteria, more particularly it relates to novel penicillins and pharmaceutically acceptable salts thereof.

Many penicillins have been proved effective in the therapy of infections caused by bacteria, but these compounds suffer from at least one or more of the following drawbacks:

(1) Being unstable in aqueous acid.
(2) Lacking ability to effectively control Pseudomonas infections.
(3) Being ineffective against so-called penicillin G-resistant strains of bacteria (e.g. many strains of *Staphylococcus aureus*).
(4) Being unstable against penicillinase produced by various microorganisms.

Many of the compounds of the present invention, in addition to their strong activity against Gram-positive bacteria, exhibit excellent resistance to decomposition by acid or penicillinase, and particularly have significant activity against Gram-negative microorganisms such as those of the genus Pseudomonas. Accordingly, the compounds of the present invention are unique in possessing all desirable activities.

There is provided, according to the present invention, a synthetic penicillin represented by the general formula

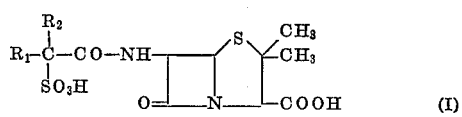

wherein each of $R_1$ and $R_2$ is hydrogen, an alkyl group, a cycloalkyl group, an aralkyl group or a substituted or unsubstituted phenyl, pyridyl, naphthyl or thienyl group, the substituent thereof being nitro, sulfo, carboxyl, halo, lower alkyl or lower alkoxy, or alternatively, $R_1$ and $R_2$ together represent a polymethylene group having 4 to 6 carbon atoms, and pharmaceutically acceptable salts thereof.

The alkyl group represented by $R_1$ and $R_2$ is an aliphatic hydrocarbon group having from 1 to 12 carbon atoms inclusive (e.g. methyl, ethyl, isopropyl, sec-butyl, tert-butyl, dodecyl, etc.).

The cycloalkyl group contains from 3 to 12 carbon atoms inclusive (e.g. cyclohexyl).

The aralkyl group is a lower aralkyl group having from 7 to 10 carbon atoms inclusive (e.g. benzyl, phenethyl, etc.).

The phenyl, naphthyl, pyridyl and thienyl groups include those substituted by one or more suitable substituents such as nitro, carboxyl, sulfo, halo (e.g. F, Cl, Br, etc.), lower alkoxy of from 1 to 6 carbon atoms (e.g. methoxy, ethoxy, n-propoxy, etc.), lower alkyl of from 1 to 6 carbon atoms (e.g. methyl, ethyl, n-propyl, iso-propyl, n-pentyl, etc.) and cycloloweralkyl of from 3 to 6 carbon atoms (e.g. cyclohexyl).

The pharmaceutically acceptable salts include salts with nontoxic metals (e.g. sodium, potassium, calcium, aluminum, magnesium, etc.) and salts with amines (e.g. ammonia, triethylamine, procaine, dibenzylamine, and other amines which have been used for various known penicillins).

For the production of the synthetic penicillins of this invention, any of the per se known means for synthesizing penicillins from 6-aminopenicillanic acid can generally be applied. More concretely, they are prepared conveniently by reacting 6-aminopenicillanic acid or a silylated derivative thereof with an acylating agent derived from an α-sulfocarboxylic acid represented by the general formula

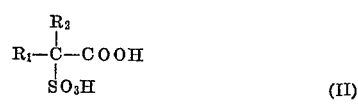

(II)

wherein $R_1$ and $R_2$ have the same meaning as defined above.

The acylating agents include acid halides (e.g. chloride, bromide, etc.) corresponding to the carboxylic acid of the general Formula (II), corresponding carboxylic acid anhydrides, particularly mixed anhydrides prepared from the carboxylic acid of the general Fomula (II) and a stronger acid such as a lower alkyl or aralkyl monoester of carbonic acid (e.g. benzyloxycarbonic acid, ethoxycarbonic acid, etc.), an acetic acid substituted by an electron withdrawing group or groups (e.g. dichloroacetic acid, trichloroacetic acid, etc.) or an alkane- or arenesulfonic acid (e.g. toluenesulfonic acid, methanesulfonic acid, etc.). In addition, the acylating agent also includes the corresponding acid azide or the corresponding active ester or thioester, i.e. an ester prepared from the carboxylic acid with a phenol or a thiophenol (e.g. p-nitrophenol, 2,4-dinitrophenol, pentachlorophenol, thiophenol). Furthermore the acylating agent should include the carboxylic acid coupled with N,N-dimethylchloroformiminium chloride, an N,N-carbonylditriazole, a carbodiimido reagent [e.g. N,N'-dicyclohexylcarbodiimide, N,N'-diisopropylcarbodiimide, or N-cyclohexyl-N' - (2-morpholinoethyl)carbodiimide], a ketenimine reagent or an isoxazolium salt reagent. Another acylating agent derived from the carboxylic acid of the general Formula (II) is the corresponding azolide, i.e. the corresponding acid amide whose amide nitrogen atom is a member of an aromatic five-membered ring containing at least two nitrogen atoms (e.g. imidazole, pyrazole, benzimidazole, etc.). Among these acylating agents, the acid halides, and particularly the acid chloride, are preferable, in view of their conveniency and low production cost.

The acylating agent is produced by a per se known method. For example, the corresponding acid halide is easily produced by first reacting the carboxylic acid of the general formula

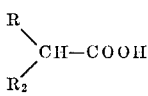

wherein $R_1$ and $R_2$ have the same meaning as defined above, with sulfur trioxide or its dioxane complex in dichloroethane at 10° to 60° C., and then treating the resultant carboxylic acid (II) with a halogenating agent (e.g. thionyl chloride, phosphorus oxychloride, phosphorus oxybromide, etc.) at 0° to 100° C., more preferably at 10° to 40° C., in the presence of a catalyst (e.g. dimethylformamide, etc.).

It should be noted that the 6-aminopenicillanic acid may be either 6-aminopenicillanic acid itself or a salt thereof. In general, it is more preferable to utilize the salt form (e.g. sodium salt, potassium salt, triethylamine salt, etc.).

As is well known, the silylated derivatives of 6-aminopenicillanic acid include mono-silyl derivatives and di-silyl derivatives; both can be employed in the method of the present invention, though the latter is preferred since it generally gives more favorable results than the former. Preferable examples of the silyl group in the silylated derivatives have the general formula

in which $R_1$, $R_2$, and $R_3$ are lower alkyl groups with from 1 to 5 carbon atoms, benzyl, phenethyl, cyclohexyl, phenyl or tolyl groups.

The acylation of the present invention is preferably performed by reacting 6-aminopenicillanic acid with an acylating agent in a suitable solvent in the presence of a suitable base.

The acylation may be conducted at room temperature, below room temperature, or even above room temperature. However, since 6-aminopenicillanic acid and its acylation products are liable to decompose at an elevated temperature, the reaction is preferably carried out at a temperature below about 50° C., and preferably from about −20° C. to about 40° C. to the extent that the reaction mixture retains its liquid form.

Suitable bases are organic bases (e.g. triethylamine, tributylamine, pyridine, piperidine, morpholine, etc.) and inorganic bases (e.g. sodium bicarbonate, potassium bicarbonate, sodium hydroxide, potassium hydoxide, sodium carbonate, potassium carbonate, etc.). The amount of base is generally 1 to 3 mols per mol of the acylating agent.

Any solvent which does not disturb the reaction may be employed for the acylation reaction. Such solvents are exemplified by water, dioxane, acetone, dimethylformamide, tetrahydrofuran, chloroform, ethylene dichloride, toluene, benzene, or mixtures of them. However, in the case where the silylated derivatives are employed, it is recommended that an inert solvent (e.g. ether, dioxane, benzene, tetrahydrofuran, chloroform, etc.) be utilized.

It should be noted that hydrolysis or alcoholysis of an acylation product produced by the reaction of an acylating agent and a silylated derivative of 6-aminopenicillanic acid is performed by merely treating the acylation product with water or a lower aliphatic alcohol (e.g. methanol, ethanol, etc.) so as to obtain the compound of the general Formula (I).

After the reaction, the objective compound of the present invention is recovered from the reaction mixture by a per se known process. If desired, these products may be purified by way of per se conventional means, e.g. recrystallization or chromatography.

Accordingly, the objective compound of the present invention is normally recovered from the reaction mixture in which it exists either as the free acid or the salt thereof. If desired, the salts may be converted by conventional methathetic reactions to other salts.

It should be noted that the penicillins of the general Formula (I) are characterized by at least two acidic functional groups, i.e. the carboxyl and sulfo moieties. Because of the difference in the relative degree of acidity of these acid groups, it is possible to prepare either an acid salt or a normal salt.

Among the penicillins (I) of the present invention, when $R_1$ represents a different group than $R_2$, the α-carbon atom of the acyl group constitutes an asymmetric carbon atom, and in such cases there exists two optical isomers, it being understood that all such individual isomeric forms as well as mixtures thereof are included in the scope of the present invention. When the acylation products are obtained as a mixture of isomers, if desired, the mixture may be resolved optically into the respective isomers by chromatography or recrystallization according to per se known procedures. Alternatively, the optically active penicillins are produced by employing an optically active acylating agent derived from a resolved carboxylic acid of the general Formula (II). The optical resolution of the carboxylic acid is carried out by per se known means, e.g. recrystallization of an optically active base (e.g. brucine, quinine) salt of the carboxylic acid.

As stated hereinabove, the novel penicillins of the present invention exhibit strong antibacterial activities against Gram-negative bacteria and penicillin G-resistant strains as well as against common Gram-positive bacteria. The following test demonstrates the peculiar antibacterial activities of typical compounds of the present invention, i.e.

(A) D- and DL-α-sulfobenzylpenicillin (disodium salts), in terms of minimum inhibitory concentration (MIC; microgram/milliliter) against a variety of bacteria, in comparison with commercially available synthetic penicillins, i.e.

(B) Ampicillin sodium salt
(C) Hexacillin
(D) Nafcillin sodium salt
(E) Dicloxacillin sodium salt

| | (A) | (B) | | | |
|---|---|---|---|---|---|
| | Optical form | | | | |
| Tested penicillins | D | DL | D(−) | (C) | (D) | (E) |
| Pseudomonas aeruginosa | 10 | 20 | >100 | >100 | >100 | >100 |
| Escherichia coli | 20 | 20 | 20–50 | 100 | >100 | >100 |
| Proteus vulgaris | 1 | 2 | 5 | 20 | >100 | >100 |
| Proteus morganii | 2 | 5 | 100 | 50 | >100 | >100 |
| Proteus mirabilis | 0.5 | 2 | 5 | 20 | >100 | >100 |
| Staphylococcus aureus | 0.5 | 2 | <0.2 | <0.2 | <0.2 | 0.1 |
| Bacillus subtilis | 0.1 | <0.2 | <0.2 | 0.2 | 0.5 | 0.1 |
| Staphylococcus aureus (penicillin G-resistant strain) | 10 | 20 | >100 | 100 | <1 | <1 |
| Resistance (percent)[1] against Bacillus cereus penicillinase | 66 | 57 | 0 | 0 | 76 | 90 |

[1] Remaining potency in percentage terms after a mixture of 0.5 milliliter of an aqueous penicillinase solution (0.1 milligram/milliliter) and 0.5 milliliter of an aqueous solution of the penicillin (2 milligram/milliliter) was kept at 34° C. for 30 minutes.

It is apparent from the foregoing table that the typical compound (A) of this invention exhibits superior results in terms of the minimum inhibitory concentration. For example, against Pseudomonas aeruginosa, the MIC for the D-form of (A) was 10 micrograms/milliliter whereas the MIC values for (B), (C), (D) and (E) were all greater than 100 micrograms/milliliter.

The penicillins of the present invention have a very low toxicity towards mammalian species and are well-tolerated even at a large dosage. They can be administered orally in capsules or tablets as well as parenterally in solutions or suspensions. For example, in the treatment of Pseudomonas infections in mammals such as mice, man or the like, the penicillins are administered with conventional procedures in an amount of from about 5 to about 50 mg./kg./day, but usually about 10 to about 30 mg./ kg./day, in divided dosages, e.g. two to four times a day.

The following examples will serve to illustrate the present invention without being limited thereto. In these examples, the parts are by weight and bear the same relationship to parts by volume as do grams to milliliters. The infrared absorption spectrum (IR) is expressed in terms of $$\nu_{max.}^{KBr.} \text{ cm.}^{-1}$$

and the nuclear magnetic resonance spectrum (NMR) is expressed in terms of $\delta$ (in $D_2O$, 60 mc.). The abbreviations s., d., t., q. and m. mean that the bands are apparent singlet, doublet, triplet, quartet and multiplet.

EXAMPLE 1

To a suspension of 1.08 parts by weight of 6-aminopenicillanic acid in 8 parts by volume of water is added 1.48 parts by weight of sodium bicarbonate. After the mixture is dissolved, a solution of 1.18 parts by weight of α-sulfophenylacetyl chloride in 10 parts by volume of diethylether is gradually added thereto. The mixture is stirred at a temperature in the neighborhood of 0° C. for 1 hour. The aqueous layer is washed twice with 10 parts by volume of portions of ether and adjusted to pH 1.2 with cation exchange resin of polystyrene sulfonic acid type under constant cooling. Then the solution is washed twice with 15 parts by volume of portions of ethyl acetate, followed by extraction twice with 15 parts by volume of portions of n-butanol. The extracts are combined and washed twice with 15 parts by volume of portions of water and, then, extracted with an aqueous solution of sodium bicarbonate. The extract is adjusted to pH 6.5, washed with ether and lyophilized to give the sodium salt of α-sulfobenzylpenicillin. Yield is 1.2 parts by weight. Upon recrystallization from water-acetone, the compound shows:

*Elementary analysis* as $C_{16}H_{16}N_2O_7S_2Na_2 \cdot 3H_2O$ calculated (percent): C, 37.50; H, 4.29; N, 5.48; S, 12.50. Found (percent): C, 37.49; H, 4.15; N, 5.58; S, 12.25.

IR: 3000 (phenyl CH str.), 1770 (lactam C=O), 1675 (—CONH—), 1615 (—COO—), 1530, 1405, 1325, 1210, 1050 (—$SO_3^-$), 700

NMR: 1.60 (6H, t.), 4.32 (1H, d.), 5.16 (1H, s.), 5.64 (2H, d), 7.56 (5H, diffused s.).

6 parts by weight of optically resolved D-α-sulfophenylacetic acid ($[\alpha]D=-23.9°$ (c.=2.0, $H_2O$)) are treated by the same procedure as above, and 6.2 parts by weight of D-α-sulfobenzylpenicillin are obtained.

$$[\alpha]D=+146.0°$$
(c.=1.0, $H_2O$).

EXAMPLE 2

To a suspension of 3.01 parts by weight of 6-aminopenicillanic acid in 25 parts by volume of dry chloroform is added 2.24 parts by weight of hexamethyl disilazane. After refluxing for 1.5 hours on a water bath at 78° C., the solvent is distilled off from the clear reaction mixture under reduced pressure at 40° C. to leave trimethylsilyl N-trimethylsilyl-6-aminopenicillanate.

The residue is dissolved in 50 parts by weight of chloroform which was purified by distillation in the presence of phosphorus pentoxide, and 1.2 parts by weight of triethylamine is added thereto at −3° C. To the solution 2.6 parts by weight of α-sulfophenylacetyl chloride is added dropwise under stirring at −3° C., the addition taking about 20 minutes. The stirring is continued for an additional 30 minutes at 0° C. The reaction mixture is washed with cold water, and the organic layer is extracted with an aqueous sodium bicarbonate solution (pH 6.5). The extract is washed with ether, and is lyophilized to give the sodium salt of α-sulfobenzylpenicillin, which is identified to be the product of Example 1.

EXAMPLES 3–18

The following penicillins of the general formula

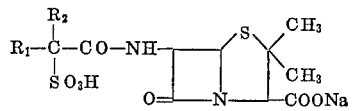

are prepared from 6-aminopenicillanic acid by way of the corresponding acid halide in accordance with the procedures in Example 1 (referred to as Procedure A) and/or in Example 2 (referred to as Procedure B):

(3) α-Sulfo-p-nitrobenzylpenicillin

Procedure: A

IR: 3000 (phenyl, —CH—, st.), 1770 C=O), 1675 (—CO—NH—), 1530, 1350 (—$NO_2$), 1050 (—$SO_3$—)

NMR: 1.60 (6H, t.), 4.25 (1H, broad S.), 5.12 (1H, S.), 5.65 (2H, d.), 7.84 (2H, d.), 8.27 (2H, q.)

(4) α-Sulfo-o-carboxybenzylpenicillin ($R_1$: H; $R_2$:

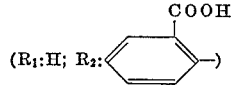

Procedure: A

IR: 3450 (—OH), 2990 (—CH—, st.), 1770 (C=O), 1675 (—CO—NH—), 1610 (—COO—), 1530, 1350 (—$NO_2$), 1050 (—$SO_3$)

(5) α-Sulfo-naphthylmethylpenicillin

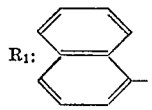

$R_2$:hydrogen;

Procedure: A, B

IR: 3350 (—OH), 3070, 3000 (—CH—), 1770 (C=O) 1670 (—CO—NH—), 1615 (—$COO^-$), 1515, 1400, 1325, 1210, 1125, 1045 (—$SO_3^-$), 830, 790, 770, 700

(6) α-Sulfo-o-methoxybenzylpenicillin

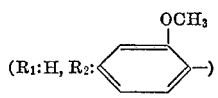

Procedure: A, B

IR: 3335 (—OH), 3000 (—CH—), 1780 (C=O), 1610 ($COO^-$), 1500, 1402, 1042 (—$SO_3^-$)

(7) α-Sulfo-5-sulfo-2-thienylmethylpenicillin

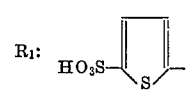

$R_2$: H);

Procedure: A

IR: 3450 (OH), 2950 (—CH=), 1760 (C=O), 1690 (—CONH—), 1605 (—$COO^-$), 1235, 1043 (—$SO_3^-$)

(8) α-Sulfo-ethylpenicillin ($R_1$: H; $R_2$: $CH_3$—);

Procedure: A, B

IR: 3450 (broad, —OH), 2980 (—CH), 1770 (C=O), 1670 (—CONH—), 1615 (—$COO^-$), 1460, 1400, 1200 (broad), 1049 (—$SO_3^-$)

(9) α-Sulfo-n-pentylpenicillin ($R_1$: $CH_3(CH_2)_3$—; $R_2$: H);

Procedure: A, B

IR: 3420 (—OH), 2980, 2850 (—CH—), 1770 (C=O), 1670 (—CONH—), 1615 (—COO⁻), 1470, 1410, 1220 (broad), 1052 (—SO₃⁻)
NMR: 0.98 (3H, t.), 1.2–1.35 (6H, m.), 1.60 (3H, s.), 1.71 (3H, s.), 3.68, 3.90 (1H, t.), 4.26, 4.35 (1H), 5.50–5.72 (2H, m.)

(10) α-Sulfo-n-undecylpenicillin (R₁: CH₃(CH₂)₉—; R₂: H);

Procedure: A, B

IR: 3370 (—OH), 2920, 2840 (—CH—), 1765 (C=O), 1665 (—CONH—), 1612 (—COO⁻), 1050 (—SO₃⁻)
NMR: 0.92 (3H), 1.33 (16H, broad s.), 1.59 (3H, s.), 1.68 (3H, s.), 3.65, 3.87 (1H, t.), 4.23, 4.30 (1H) 5.59 (2H, m.)

(11) α-Sulfo-p-chlorobenzylpenicillin

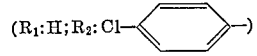

Procedure: A, B

IR: 3360 (broad, —OH), 2950 (—CH—), 1760 (C=O), 1670 (—CO—NH—), 1610 (—COO⁻), 1490, 1408, 1320, 1240, 1210, 1091, 1047 (—SO₃⁻), 1015
NMR: 1.49, 1.55, 1.63 (6H, t.), 4.25, 4.28 (1H, d.), 5.11 (1H, s.), 5.55, 5.61 (2H, d.), 7.50, 7.52 (4H, d.)

(12) α-Sulfo-cyclohexylmethylpenicillin

Procedure: A, B

IR: 3420 (—OH), 2980 (—CH), 1770 (C=O), 1680-(Shoulder), 1612 (—COO⁻), 1410, 1210–1250 (broad), 1051 (—SO₃⁻)

(13) α-Sulfo-phenethylpenicillin

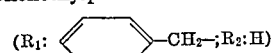

Procedure: A, B

IR: 3390 (—OH), 1765 (C=O), 1670 (—CO—NH—), 1610 (—COO⁻), 1250–1210, 1043 (—SO₃⁻)
NMR: 1.53, 1.58 (3H, d.), 1.62, 1.62 (3H, d.), 3.42 (2H, m.), 4.22 (1H, s.), 4.20 (1H, s.), 5.42, 5.55 (2H, q.), 7.39 (5H, s.)

(14) α-Sulfo-p-methylbenzylpenicillin

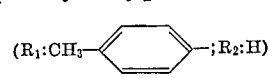

Procedure: A, B

IR: 3400 (—OH), 2980, 2940 (—CH—), 1765 (C=O), 1672 (—CONH—), 1612 (—COO⁻), 1250–1215, 1050 (—SO₃⁻)
NMR: 1.51, 1.55, 1.63 (6H, t.), 2.35 (3H, s.), 4.26, 4.30 (1H, d.), 5.06 (1H, s.), 5.56, 5.60 (2H, d.), 7.28, 7.48 (4H, q.)

(15) α-Sulfo-cyclohexylpenicillin (R₁ and R₂, taken together: —(CH₂)₅—);

Procedure: A, B

IR: 3420 (—OH), 2950 (—CH—), 1770 (C=O), 1664 (—CONH—), 1610 (—COO⁻), 1045 (SO₃⁻)
NMR: 0.7–1.54 (10H, m.), 1.68, 1.70 (3H, d.), 1.61 1.65 (3H, d.), 4.33 (1H, s.), 5.63 (2H, d.)

(16) α-Sulfo-p-cyclohexylbenzylpenicillin

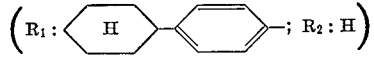

Procedure: A, B

IR: 3420 (—OH), 1770 (C=O), 1660 (—CO—NH—), 1615 (—COO⁻), 1410 (—CH—), 1250–1215, 1046 (—SO₃⁻)

(17) α-Sulfo-2,4-dichlorobenzylpenicillin (R₁:

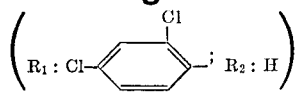

Procedure: A, B

IR: 3410 (—OH), 2980, 2920 (—CH), 1768 (C=O), 1675, 1618 (—COO⁻), 1515, 1475, 1407, 1325, 1220–45 (broad), 1045 (—SO₃⁻)
NMR: 1.49 (3H, s.), 1.58 (3H, s.), 4.26 (1H, s.), 5.54 (1H, s.), 5.60, 5.70 (2H, d.), 7.3–8.02 (3H, m.)

(18) α-Sulfo-p-fluorobenzylpenicillin)

Procedure: A

IR: 3400 (OH), 2960 (—CH—), 1765 (β-lactam), 1670 (—CONH—), 1609 (—COO⁻), 1225 (—SO₂—), 1045 (—SO₃⁻)
NMR: 1.53, 1.57, 1.65 (6H, t.), 4.28, 4.31 (1H, d.), 5.16 (1H, s.), 5.57, 5.62 (2H, d.), 6.95–7.85 (4H, m.)

What is claimed is:

1. A synthetic penicillin selected from the group consisting of a compound of the general formula

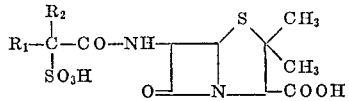

wherein R₁ and R₂ are hydrogen, alkyl group having 1–12 carbon atoms, cycloalkyl group having 3–12 carbon atoms, aralkyl group having 7–10 carbon atoms or a substituted or unsubstituted phenyl, pyridyl, naphthyl or thienyl group, the substituent being one or more of nitro, sulfo, carboxyl, halo, lower alkyl, lower alkoxy and cycloloweralkyl groups, or R₁ and R₂ together represent a polymethylene group having 4–6 carbon atoms and pharmaceutically acceptable salts thereof.

2. A compound as claimed in claim 1, wherein the pharmaceutically acceptable salt is a sodium, potassium, magnesium, calcium, aluminum, ammonia, triethylamine, procaine or dibenzylamine salt.

3. A compound as claimed in claim 1, wherein R₁ is phenyl and R₂ is hydrogen.

4. A compound as claimed in claim 1, wherein R₁ is p-nitrophenyl and R₂ is hydrogen.

5. A compound as claimed in claim 1, wherein R₁ is hydrogen and R₂ is o-carboxyphenyl.

6. A compound as claimed in claim 1, wherein R₁ is naphthyl and R₂ is hydrogen.

7. A compound as claimed in claim 1, wherein R₁ is hydrogen and R₂ is o-methoxyphenyl.

8. A compound as claimed in claim 1, wherein R₁ is 5-sulfo-2-thienyl and R₂ is hydrogen.

9. A compound as claimed in claim 1, wherein R₁ is hydrogen and R₂ is methyl.

10. A compound as claimed in claim 1, wherein R₁ is n-butyl and R₂ is hydrogen.

11. A compound as claimed in claim 1, wherein R₁ is decyl and R₂ is hydrogen.

12. A compound as claimed in claim 1, wherein R₁ is cyclohexyl and R₂ is hydrogen.

13. A compound as claimed in claim 1, wherein R₁ is p-chlorophenyl and R₂ is hydrogen.

14. A compound as claimed in claim 1, wherein R₁ is benzyl and R₂ is hydrogen.

15. A compound as claimed in claim 1, wherein R₁ is tolyl and R₂ is hydrogen.

16. A compound as claimed in claim 1, wherein R₁ is p-cyclohexylphenyl and R₂ is hydrogen.

17. A compound as claimed in claim 1, wherein R₁ and R₂ together represent pentamethylene.

18. A compound as claimed in claim 1, wherein R₁ is 2,4-dichlorophenyl and R₂ is hydrogen.

19. A compound as claimed in claim 1, wherein R₁ is p-fluorophenyl and R₂ is hydrogen.

20. A mixture of the compounds as claimed in claim 1, which mixture consists essentially of a racemic mixture of the D- and L-isomers of a compound of claim 1.

21. A compound as claimed in claim 1, in the form of the D-isomer.

22. A mixture of the compounds as claimed in claim 2, which mixture consists essentially of a racemic mixture of the D- and L-isomers of a compound of claim 2.

23. A compound as claimed in claim 2, in the form of the D-isomer.

24. A racemic mixture of the D- and L-isomers of the compound of claim 3.

25. The D-isomer of the compound of claim 3.

References Cited

UNITED STATES PATENTS

| | | | |
|---|---|---|---|
| 3,382,238 | 5/1968 | Dolfini | 260—239.1 |
| 3,249,622 | 5/1966 | Herrling et al. | 260—239.1 |

NICHOLAS S. RIZZO, Primary Examiner

U.S. Cl. X.R.

424—271